No. 706,320. Patented Aug. 5, 1902.
J. A. JENNEY.
STEAM ENGINE.
(Application filed May 9, 1901.)
(No Model.)

WITNESSES,
INVENTOR,
James A. Jenney
BY Horatio E. Bellows
ATT'Y.

UNITED STATES PATENT OFFICE.

JAMES A. JENNEY, OF PROVIDENCE, RHODE ISLAND.

STEAM-ENGINE.

SPECIFICATION forming part of Letters Patent No. 706,320, dated August 5, 1902.

Application filed May 9, 1901. Serial No. 59,494. (No model.)

*To all whom it may concern:*

Be it known that I, JAMES A. JENNEY, a citizen of the United States, residing at Providence, in the county of Providence and State of Rhode Island, have invented a certain new and useful Improvement in Steam-Engines, of which the following is a specification, reference being had therein to the accompanying drawings.

My invention relates to engines used in vehicles, boats, and light manufacturing plants. Its primary purposes are those sought in ordinary mechanisms of the same class—compactness, simplicity, lightness, and freedom from vibration and noise. These ends are attained by my improved structure, which dispenses with stuffing-boxes, fly-wheel, and piston-rod and by its novel and symmetrical construction and arrangement of parts escapes dead-centers. By the positive action of its novel valve structure friction and noise are avoided. The circular multiple-cylinder arrangement affords a steady exhaust, and the symmetrical contour makes it possible to inclose the engine-gearing in an oil-chamber and escape injury from grit.

Figure 1:
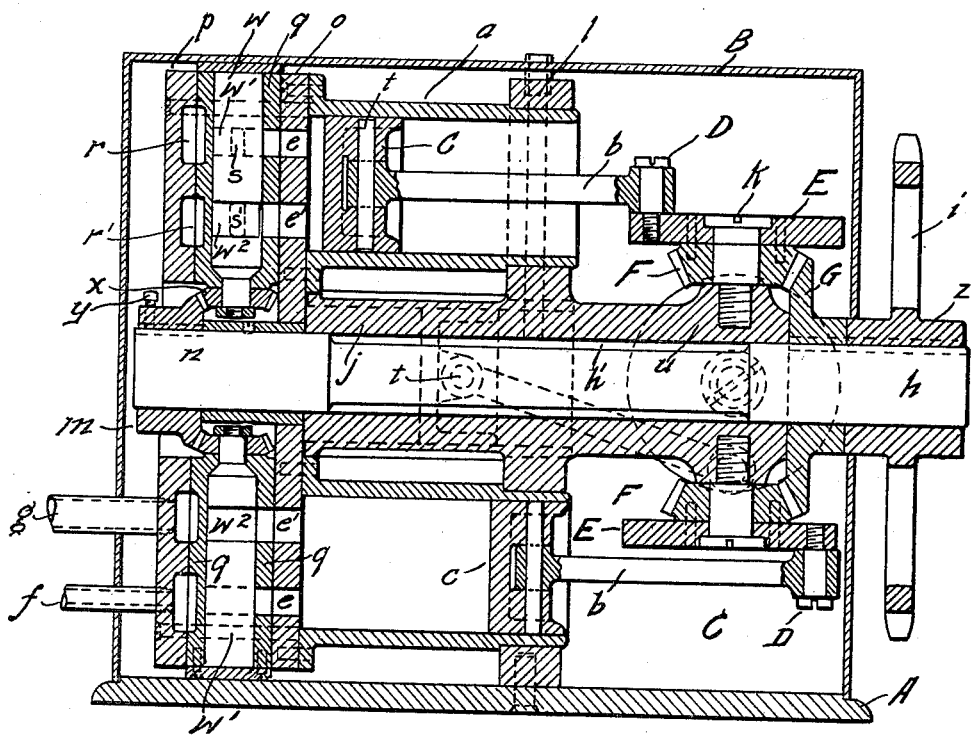
Figure 3:
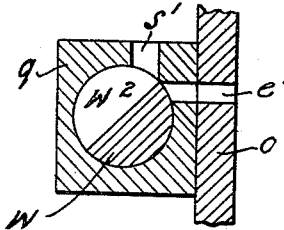
Figure 4:
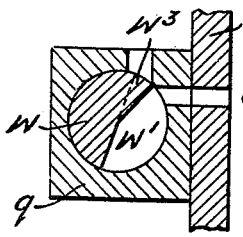
Figure 2:
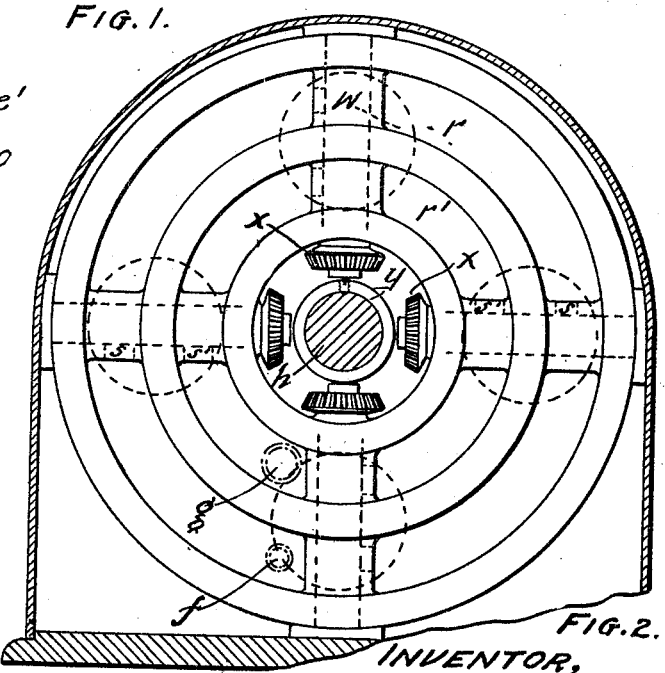

In the accompanying drawings, wherein like letters of reference indicate like parts throughout, Figure 1 is a longitudinal central section of my improved engine; Fig. 2, a rear elevation of the same after the back plate has been removed, showing the shaft and outer covering in section; Fig. 3, a transverse section of the exhaust-valve and seat, and Fig. 4 a similar view of the steam-valve and seat.

In detail the engine rests upon any suitable bed or base A, which supports an outer inclosing cylindrical casing B. The lower forward half of the compartment C thus formed may be filled with oil for lubricating the parts.

Integral with the frame $l$ and horizontally disposed is a shaft-casing $j$, which incloses the driving-shaft $h$ and traverses the center of the engine. Arranged equidistant about the shaft-casing are four cylinders $a$, with pistons $c$ and connecting-rods $b$, the latter being pivoted at one end to said pistons by pins $t$, at the other end by crank-pins D to the upper face of crank-disks E. Upon the bottom of said crank-disks are fixed beveled gears $f$. These disks and gears revolve on pins $k$, mounted on lugs $u$ of the shaft-casing. The beveled gears F mesh with the large beveled gear G, keyed to the main shaft, and are each one-half the size of the beveled gear G. To the outer extremity of the shaft $h$ is keyed a collar $z$, which forms the hub of a sprocket driving wheel or pulley $i$. Supporting the rear ends of the cylinders $a$ is a disk $o$, fastened to the shaft-casing. Fixed to the rear of said disk is a valve-casing $q$ for four cylindrical valves $w$, which are radially disposed to correspond with their four respective cylinders. The valves carry upon their lower ends smaller beveled gears $x$. The latter mesh with a large beveled gear $m$, which is twice the size of each of the smaller gears. This larger gear is mounted on the rear end of the driving-shaft and is provided with a set-screw $y$ for binding the same to the driving-shaft. By this arrangement the gear $m$ may be readily slipped along or from the driving-shaft when it is desired to readjust the valves. A loose collar $n$ surrounds the main shaft, between the latter and the disk $o$. The driving-shaft has a reduced diameter for a distance to form a lubricating-opening $h'$. Leading from each of the valves to each of the cylinders are two ports $e$ and $e'$—the first a steam and the second an exhaust port—while corresponding passages $s$ and $s'$ at right angles to the former passages lead, respectively, from the steam and exhaust chambers $r$ and $r'$. The outer face of casing $q$ has two radial channels which correspond with two similar channels upon the inner face of the exterior plate $p$, forming therewith the annular chambers $r$ and $r'$, the former an inlet and the latter an exhaust chamber. A steam and exhaust pipe $f$ and $g$, respectively, lead to the inlet and exhaust chambers.

Referring in detail to the valve mechanism, the cylindrical valve $w$ has two transverse slots $w'$ $w^2$, located one above the other upon opposite sides of the valve, and each slot extends to the depth of about one-half the diameter of the valve. The exact form of these slots is shown cross-sectionally in Figs. 3 and 4, wherein the dwelling-surfaces of the valves are one hundred and eighty degrees plus a slight lap or lead $w^3$. Fig. 3 shows the exhaust-port, and Fig. 4 the steam-port. In the latter figure the rotating valve $w$ is shown in its advance to have just cut off the steam, while at the same time, as shown in Fig. 3, the exhaust-port is upon the point of opening. It is evident, however, that the contour of the valve-slots $w'$ and $w^2$ may be varied to meet individual requirements.

The operation of the engine is as follows: Steam enters through the pipe $f$ the annular steam-chamber $r$ by way of the slot $s$ in the valve-casing. The rotation of the valve $w$ brings the slot $w'$ opposite the entrance of port $e$ of the cylinder, moving the piston outward to the end of its stroke. Thereupon the slot $w^2$ of the revolving valve registers with opening $e'$, thus connecting the cylinder with the exhaust-chamber $r'$. The piston and valves of each cylinder are so adjusted that when the stroke in one cylinder is completed the piston of the next adjacent cylinder has made half of the stroke, thus assisting the first piston past the center. This action takes place successively in each of the cylinders, with a result that there are two outwardly-moving pistons and two exhausts open at the same time. The beveled gears F and $x$ being, as above stated, one-half the size of the bevels G and $m$, respectively, results in the semi-rotation of the valves upon each stroke of the piston, alternately admitting and exhausting steam. The entry of steam into four cylinders from the same chamber and the exhaust of all the cylinders into an adjacent independent chamber dispenses with a complexity of pipes.

Having thus described my invention, what I claim as new, and desire to secure by Letters Patent, is—

1. In a steam-engine, the combination with the casing and the driving-shaft, of a plurality of equidistant cylinders arranged about said casing parallel with the driving-shaft, pistons in said cylinders, crank-disks, pivoted connecting-rods connecting the disks and pistons, bevel-gears fixed to said disks, a larger bevel-gear on the driving-shaft meshing with said bevel-gears, valve-chambers at one end of the casing, rotatable valves in said chambers a gear on the driving-shaft and gears on the stems of the said valves meshing with said gear, all substantially as shown and described.

2. In a steam-engine, the combination with the casing having valve-chambers at one end, and the driving-shaft, of a plurality of equidistant cylinders arranged about said casing parallel with the driving-shaft, pistons in said cylinders, crank-disks, pivoted connecting-rods connecting the crank-disks and pistons, bevel-gears fixed to said disks, a larger bevel-gear on the driving-shaft meshing with said bevel-gears, rotatable valves in said valve-chambers, a gear on the driving-shaft, gears on the stems of the valves meshing with said gear, and means for adjusting the last-mentioned gear to readjust the said valves, as set forth.

3. In a steam-engine, the combination with a plurality of cylinders, of pistons, and their connecting-rods, crank-disks rotated by said connecting-rods, gears fixed to the crank-disks, a larger gear on the driving-shaft, a driving-shaft, a shaft-casing upon which said disks and gears are supported, and a gear fixedly mounted upon the driving-shaft meshing with the said gears, rotatable valves and gears carried by the stems thereof and meshing with the larger gear on the driving-shaft.

4. In a steam-engine, the combination with a plurality of cylinders circularly arranged about the driving-shaft of a plurality of cylindrical valves governing the engine-ports and radiating from the driving-shaft, gears upon the inner ends of valve-stems, a driving-shaft, and a large gear mounted thereon meshing with the smaller gears, means for adjusting said larger gear, and a sprocket-wheel on the outer end of the driving-shaft.

5. In a steam-engine, the combination of the cylinders, arranged parallel with the driving-shaft, the pistons therein, a series of cylindrical valves, radially disposed in relation to a central driving-shaft, each valve being provided with a plurality of transverse slots located one above the other upon opposite sides of the valves, a driving-shaft, and a sprocket-wheel on the outer end of said shaft and means connected with said driving-shaft for simultaneously rotating the valves, and means for adjusting said valves.

In testimony whereof I have affixed my signature in presence of two witnesses.

JAMES A. JENNEY.

Witnesses:
HORATIO E. BELLOWS,
ALFRED P. QUACKENBOS.